United States Patent
Wang

(10) Patent No.: US 12,153,138 B2
(45) Date of Patent: Nov. 26, 2024

(54) IMAGE PROCESSING METHOD AND SYSTEM FOR OPTICAL DISTANCE MEASUREMENT

(71) Applicant: PixArt Imaging Inc., Hsin-Chu (TW)

(72) Inventor: Guo-Zhen Wang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 18/376,430

(22) Filed: Oct. 3, 2023

(65) Prior Publication Data

US 2024/0027619 A1 Jan. 25, 2024

Related U.S. Application Data

(63) Continuation of application No. 17/485,518, filed on Sep. 27, 2021, now Pat. No. 11,808,852, which is a continuation of application No. 16/108,066, filed on Aug. 21, 2018, now Pat. No. 11,163,063, which is a continuation of application No. 14/864,809, filed on Sep. 24, 2015, now Pat. No. 10,088,568.

(30) Foreign Application Priority Data

Dec. 29, 2014 (TW) .................. 103146094

(51) Int. Cl.
  *G01S 17/48* (2006.01)
  *G01S 7/4912* (2020.01)
  *G01S 7/4913* (2020.01)

(52) U.S. Cl.
  CPC ............ *G01S 17/48* (2013.01); *G01S 7/4912* (2013.01); *G01S 7/4913* (2013.01)

(58) Field of Classification Search
  None
  See application file for complete search history.

(56) References Cited

U.S. PATENT DOCUMENTS

| | | |
|---|---|---|
| 4,575,304 A | 3/1986 | Nakagawa |
| 2005/0111009 A1 | 5/2005 | Keightley |
| 2008/0159595 A1 | 7/2008 | Park |
| 2009/0262369 A1 | 10/2009 | Chuang |
| 2010/0045963 A1 | 2/2010 | Yamaguchi |
| 2010/0277748 A1 | 11/2010 | Potapenko |
| 2012/0062868 A1 | 3/2012 | Kludas |
| 2012/0069320 A1 | 3/2012 | Slmonov |
| 2013/0135605 A1 | 5/2013 | Wada |
| 2013/0141538 A1 | 6/2013 | DaneshPanah |
| 2013/0169595 A1 | 7/2013 | Chang |

(Continued)

FOREIGN PATENT DOCUMENTS

| | | |
|---|---|---|
| CN | 101561267 A | 10/2009 |
| CN | 101652628 A | 2/2010 |

(Continued)

*Primary Examiner* — Eric L Bolda
(74) *Attorney, Agent, or Firm* — Winston Hsu

(57) ABSTRACT

An image processing method includes: acquiring a plurality of sensed values based on detecting light; comparing sensed values of each row with a corresponding threshold value to select a plurality of selected sensed values from the plurality of sensed values; determining a location of a centroid according to the plurality of selected sensed values; and calculating a plurality of depth values with respect to a plurality of detecting points according to the location of the centroid and a plurality of depth information transformation functions respectively corresponding to the detecting points.

8 Claims, 7 Drawing Sheets

(56) References Cited

U.S. PATENT DOCUMENTS

| | | |
|---|---|---|
| 2014/0016113 A1 | 1/2014 | Holt |
| 2014/0055575 A1 | 2/2014 | Imamura |
| 2015/0092018 A1 | 4/2015 | Kang |
| 2015/0299992 A1 | 10/2015 | Shirai |
| 2016/0018526 A1 | 1/2016 | Van Den Bossche |
| 2016/0252619 A1 | 9/2016 | Markendorf |
| 2018/0073873 A1 | 3/2018 | Takao |
| 2018/0101173 A1 | 4/2018 | Banerjee |

FOREIGN PATENT DOCUMENTS

| | | |
|---|---|---|
| CN | 101655350 A | 2/2010 |
| CN | 102356298 A | 2/2012 |
| CN | 102706319 A | 10/2012 |
| CN | 103116739 A | 5/2013 |
| CN | 103456007 A | 12/2013 |
| EP | 0 970 391 B1 | 12/2001 |
| TW | 201231935 | 8/2012 |
| TW | 201323832 | 6/2013 |
| TW | 201415415 | 4/2014 |
| TW | 201416644 | 5/2014 |
| WO | 2012/077039 A1 | 6/2012 |

IMAGE PROCESSING METHOD AND SYSTEM FOR OPTICAL DISTANCE MEASUREMENT

CROSS REFERENCE TO RELATED APPLICATIONS

This application is a continuation application of U.S. application Ser. No. 17/485,518, filed on Sep. 27, 2021, which is a continuation application of U.S. application Ser. No. 16/108,066, filed on Aug. 21, 2018, which is a continuation application of U.S. application Ser. No. 14/864,809, filed on Sep. 24, 2015. The contents of these applications are incorporated herein by reference.

BACKGROUND OF THE INVENTION

1. Field of the Invention

The present invention relates to optical distance measurement, and more particularly, to an optical distance measurement system and related method having sensed values filtration mechanism and low hardware resources requirement.

2. Description of the Prior Art

A conventional distance measurement system captures reflection caused by light encountering an obstacle, and analyzes a location where the reflection comes from to determine a distance from the distance measurement system to the obstacle (i.e., depth of the obstacle). Such measurement is based on triangulation, which calculates depth information of the obstacle according to the location where the reflection comes from. In modern applications, the light sources usually emits linear light rather than spot light, which allows to simultaneously obtain depth information with respect to multiple points on the obstacle such that the distance measurement can be speeded up. However, the distance measurement system determines the depth information based on predetermined parameters and measured data. Calculation of the depth information with respect to different points on the obstacle actually relies on different predetermined parameters. Hence, the distance measurement system needs a huge amount of storage space and hardware resources to store predetermined parameters for different detecting points and calculate the depth information based on these predetermined parameters.

SUMMARY OF THE INVENTION

With aforementioned in mind, it is one objective of the present invention to provide a depth information calculation method with reduced requirements of storage space and hardware resources. The present invention uses locations of centroid of few detecting points to calculate depth information corresponding to more detecting points. In addition, the preset invention improves the reliability of sensed values by filtration mechanism on sensed values, thereby improves the accuracy of depth information calculation.

According to one embodiment of the present invention, an image processing method is provided. The image processing method comprises: acquiring a plurality of sensed values based on detecting light; comparing sensed values of each row with a corresponding threshold value to select a plurality of selected sensed values from the plurality of sensed values; determining a location of a centroid according to the plurality of selected sensed values; and calculating a plurality of depth values with respect to a plurality of detecting points according to the location of the centroid and a plurality of depth information transformation functions respectively corresponding to the detecting points.

According to one embodiment of the present invention, an image processing system is provided. The image processing system comprises an optical sensing device, a filtering module, a centroid determination module and a depth information calculation module. The optical sensing device is arranged for acquiring a plurality of sensed values based on detecting light. The filtering module is coupled to the optical sensing device and arranged for comparing sensed values of each row with a corresponding threshold value to select a plurality of selected sensed values from the plurality of sensed values. The centroid determination module is coupled to the filtering module and arranged for determining a location of a centroid according to the plurality of selected sensed values. The depth information calculation module is coupled to centroid determination module and arranged for calculating a plurality of depth values with respect to a plurality of detecting points according to the location of the centroid and a plurality of depth information transformation functions respectively corresponding to the detecting points.

According to one embodiment of the present invention, an image processing method is provided. The image processing method comprises: acquiring a plurality of sensed values at different times; comparing sensed values of each row with a corresponding threshold value to select a plurality of selected sensed values from the plurality of sensed values that are acquired at different times; determining a plurality of locations of centroid according to the plurality of selected sensed values; and calculating a plurality of depth information corresponding to the plurality of locations of centroid according to the plurality of locations of centroid and a plurality of transformation functions.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
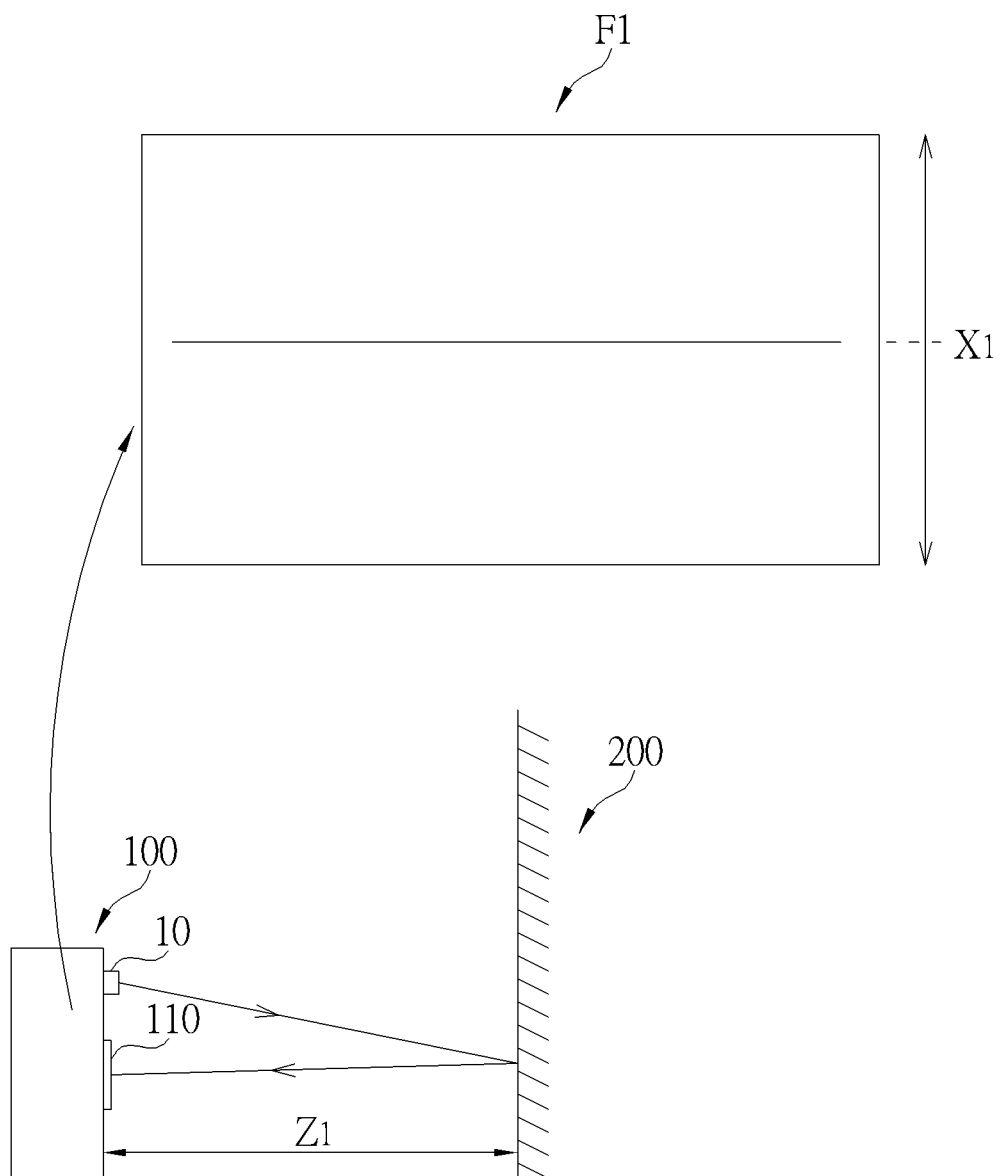
FIG. 1A and FIG. 1B illustrate principles of an optical distance measurement system of the present invention.
Figure 1B:
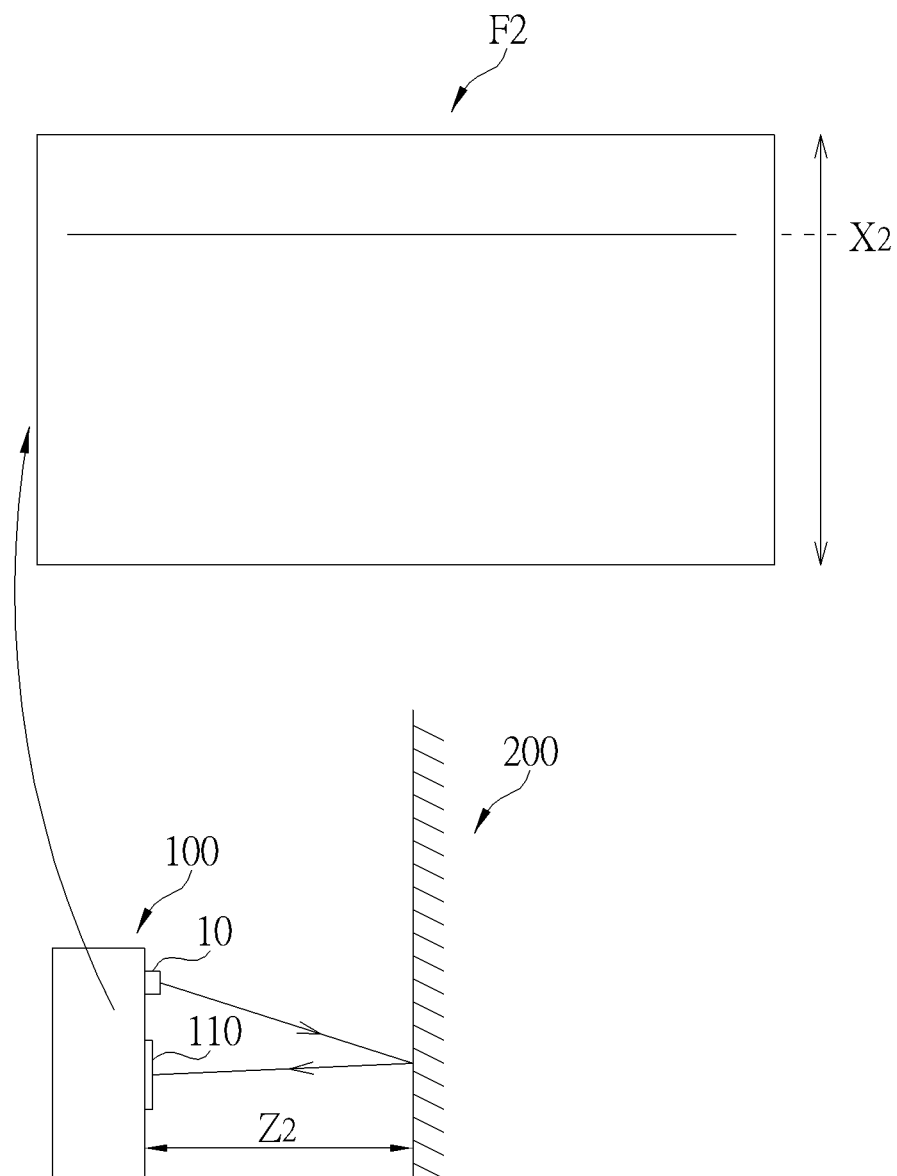

Please refer to FIG. 1A and FIG. 1B, which illustrate principles of an optical distance measurement system 100 of the present invention. As shown by FIG. 1A, the optical distance measurement system 100 utilizes a light source 10 to emit light. When the light encounters an obstacle 200, reflection occurs. The reflected light is then captured by an optical sensing device 110 of the optical distance measurement system 100, thereby generating a sensed frame. The light source 10 is a line light source, and therefore there is a linear image formed on image position $X_1$ within the sensed frame F1 generated by the optical sensing device 110. In FIG. 1B, when a distance between the optical distance measurement system 100 and the obstacle 200 becomes $Z_2$ from $Z_1$, the linear image will be located on the image position $X_2$ of the sensed frame F2 generated by the optical sensing device 110. As an angle between the light source 10 and a horizontal plane as well as a distance between the light source 10 and the optical sensing device 110 is knowable, by virtue of triangulation, the distance $Z_1$ and $Z_2$ (hereinafter as depth information) between the optical distance measurement system 100 and the obstacle 200 can be determined according to the positions $X_1$ and $X_2$ of the linear image.

In the flow of the present invention, before the position of the centroid is determined (i.e., the image positions $X_1$ and $X_2$), the reliability of the sensed values needs to be enhanced. That is, unreliable sensed values will be appropriately excluded, which is achieved by following filtering operations.

Firstly, when the optical sensing device 110 generates a sensed frame, the present invention picks up a proper region of interest (ROI) within the sensed frame. Only the sensed values inside the ROI will be selected, and the sensed values outside the ROI will be excluded. This is because the optical distance measurement system has its limitation on use. It is difficult to measure depth information of the obstacle far away from the distance measurement system because the reflection coming from the faraway obstacle cannot be effectively captured to get valid sensed values (due to the limited intensity of the light). In other words, the sensed values outside the ROI could be noises or generated by other light sources rather than the light source of the optical distance measurement. With the ROI filtering, such sensed values can be excluded.

Further, according to sensed values of each row of pixels in the sensed frame, the present invention calculates a threshold value for each row of pixels. Then, compare sensed values of each row of pixels with a threshold value corresponding to the row. Sensed values lower than the threshold value will be considered as noises and excluded, and sensed values higher than the threshold value will be reserved and used in depth information calculation. In one embodiment, a threshold value for a row of pixels can be determined by a maximum SMAX (which is a greatest value of sensed values of pixels of the row) and a mean SAVG (which is a mean of sensed values of pixels of the row), and the threshold value is equal to (SMAX+SAVG)/2. Please note that, this is just one way of calculating the threshold values, and should not be considered as limitations of the present invention.

After the sensed values are filtered by the above-mentioned ROI filtering and threshold value filtering to exclude noises/unwanted sensed values, a confidential level of each row of sensed values will be further considered. The sensed values of low intensities will not be considered (from point of view of a row of pixels). As a subsequence, ambiguous sensed values can be excluded. That is, some sensed values may not be determined as noises in the ROI filtering and the threshold value filtering, but these sensed values might have weak intensity, which could be interfered with by stronger noises in the sensed frame. In order to improve the reliability of the sensed values, a confidence level filtering will be applied to exclude ambiguous sensed values and reserve the unambiguous sensed values. In one embodiment, the confidence level is determined according to the determined threshold value. As mentioned above, each row of sensed values corresponds to a specific threshold value. According to the threshold value, sensed values in a row that are higher than the threshold value corresponding to that row will be summed to obtain a summation $S_{SUM}$, while those are lower than the threshold value will be averaged to obtain a low mean $S_{LAVG}$. The confidence level corresponding to a row will be $S_{SUM}/S_{LAVG}$. When a confidence level of a row is lower than a predetermined lowest confidence level, the sensed values of that row will be determined as unreliable. Similar to the threshold value filtering, the unreliable sensed values will be excluded and not used in the depth information calculation. With the above-mentioned filtering, one or multiple rows of sensed values can be therefore obtained. According to reserved sensed values, a centroid of a row of pixels will be determined, which can be used to determine distances of the obstacle 200 with respect to each detecting point.

There is a function between the position of the centroid $X_N$ and the depth of the obstacle 200. This function could be approximated and expressed as an M-degree polynomial as below:

$$Z_M(x)=K_0(X_N)^M+K_1(X_N)^{(M-1)}+\ldots K_M$$

Figure 2:
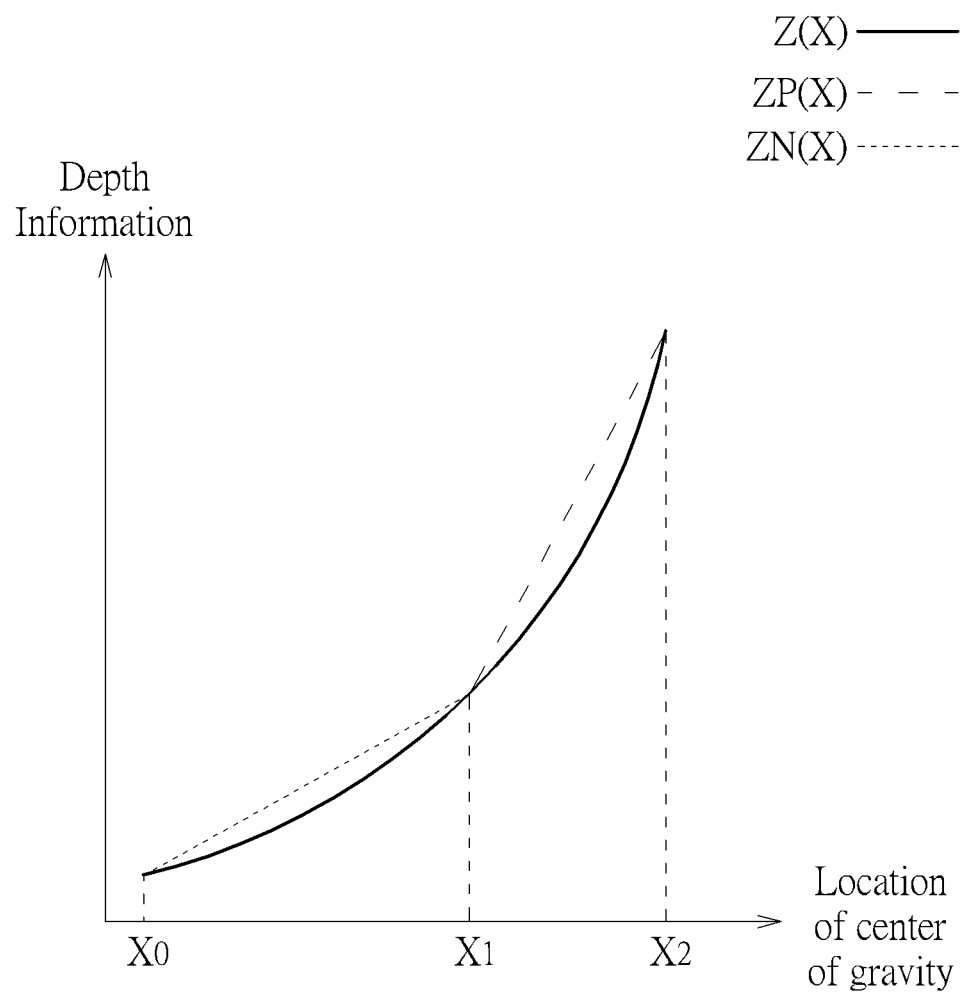
FIG. 2 illustrates how to use linear functions to approximate a real function between a position of a centroid and a depth.

If the degree M is higher, the M-degree polynomial could be more close to the actual function between the position of the centroid and the depth. However, based on hardware cost considerations, the degree M should be controlled. Hence, the present invention uses linear functions to approximate M-degree polynomial function. Please refer to FIG. 2, which illustrates using two linear functions ZP(x) and ZN(x) to be an approximation of the function Z(x), which should be ideally approximated by a higher degree polynomial. When it is detected that the centroid is located between $X_0$ and $X_1$, the polynomial ZN(x) will be used to calculate the depth information, and when it is detected that the centroid is located between $X_1$ and $X_2$, the polynomial ZP(x) will be used to calculate the depth information. A depth information transformation function Z' (x) that is based on two-step linear approximation can be expressed as:

$$Z'(x)=ZN(x), X_0<x<X_1;$$

$$=ZP(x), X_1<x<X_2$$

With such technique, the number of coefficients of the M-degree polynomial needs to be stored by the storage device can be significantly reduced. Also, complicated calculation on high-degree terms of the M-degree polynomial can be avoided (which needs more hardware resources). Please note that the above-mentioned number of linear functions used to approximate the M-degree polynomial is just for purpose of illustrates rather than limitation. In other embodiments, other number of linear functions can be used to approximate in more steps.

Figure 3:
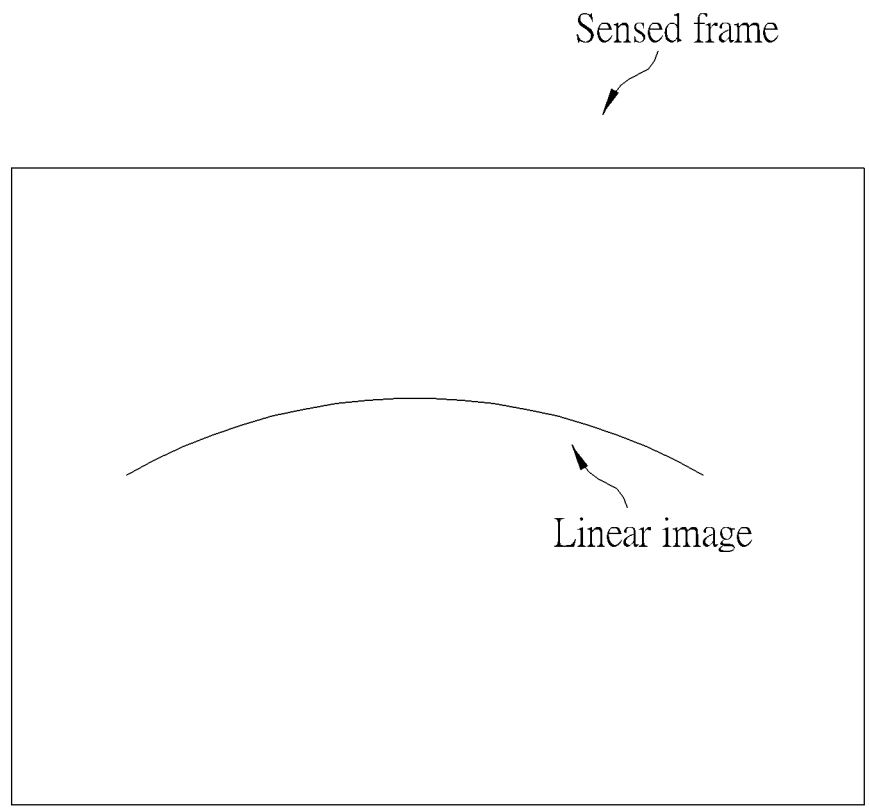
FIG. 3 illustrates geometric distortion of a linear image in a sensed frame.

On the other hand, as the optical sensing device 110 of the optical distance measurement system 100 receives the light through lens. However, the edge of lens usually causes geometric distortion, which causes a linear image to be visually non-linear in the sensed frame (as shown by FIG. 3). Due to such distortion, the determined position of the centroid cannot be used to calculate depth information corresponding to all detecting points based on only one depth information transformation function. Hence, it is necessary to determine the depth information transformation function for each detecting point. However, it needs a huge amount of storage space to record depth information transformation functions for all detecting points. In order to reduce the needed amount of storage space, the present invention uses depth information transformation functions of specific detecting points to approximate the depth information transformation functions of other detecting points, which is explained by FIG. 4.

Figure 4:
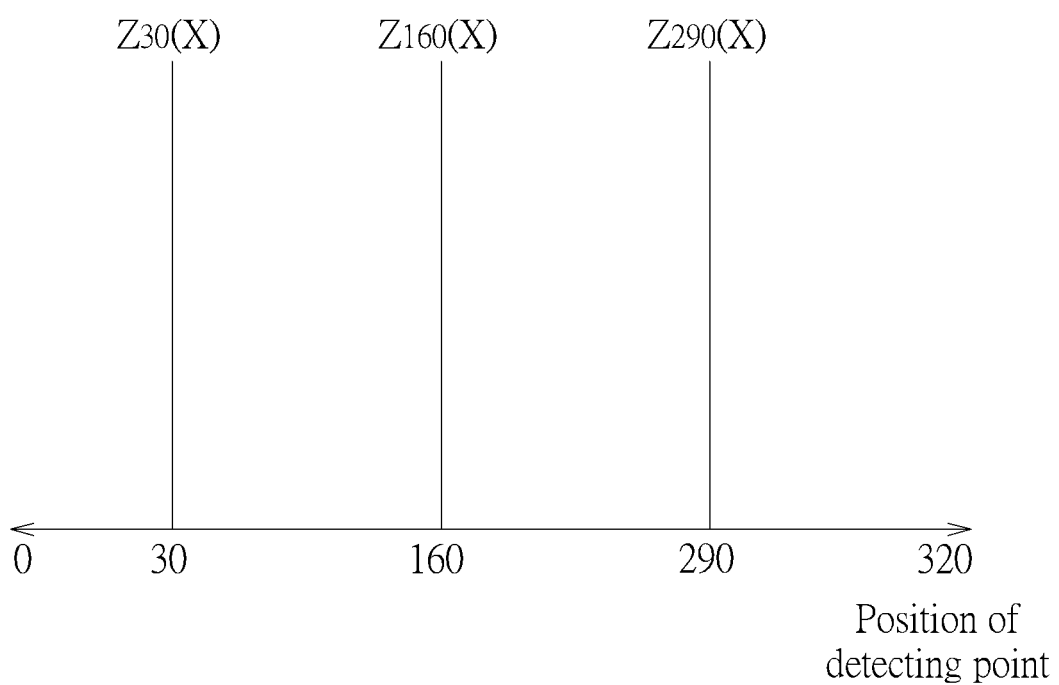
FIG. 4 illustrates how to use depth information transformation functions of specific detecting points to determine depth information transformation functions of other detecting points.

As shown by FIG. 4, it is assumed that the optical distance measurement system includes 320 detecting points $P_1$-$P_{320}$. The optical distance measurement system of the present invention only records depth information transformation function $Z_{30}(x)$ corresponding to the detecting point $P_{30}$, depth information transformation function $Z_{160}(x)$ corresponding to the detecting point $P_{160}$ and depth information transformation function $Z_{290}(x)$ corresponding to the detecting point $P_{290}$. Each of depth information transformation functions $Z_{30}(x)$, $Z_{160}(x)$ and $Z_{290}(x)$ are determined by the above-mentioned linear function approximation. Depth information transformation functions of other detection points are determined by transformation functions $Z_{30}(x)$, $Z_{160}(x)$ and $Z_{290}(x)$ and corresponding weighing factors.

For example, the depth information transformation function $Z_{100}(x)$ corresponding to the detecting point $P_{100}$ could be determined by the depth information transformation functions corresponding to detecting points $P_{30}$ and $P_{160}$ which the point $P_{100}$ are surrounded by. Specifically, the depth information transformation function $Z_{100}(x)$ could be determined as:

$$Z_{100}(x)=w0*Z_{30}(x)+w1*Z_{160}(x);$$

Furthermore, depth information transformation functions corresponding to the detecting points that are located between the detecting points $P_{160}$ and $P_{290}$ could be determined according to a weighted summation based on $Z_{160}(x)$ and $Z_{290}(x)$. It should be noted that determination of depth information transformation function of each detecting point and corresponding weighting factors varies with the position of the detecting point. For example, the detecting point $P_{20}$ that is at the left side of the detecting point $P_{30}$ could have a depth information transformation function $Z_{20}$ as below:

$$Z_{20}(x)=w3*Z_{30}(x)+w4*Z_{160}(x).$$

With such technique, the requirement of storage space could be significantly reduced. In addition, the optical distance measurement system only needs to record a couple of specific depth information transformation functions and weighting factors for each detecting point. According to this information, the depth information transformation function of each detecting point can be determined. Then, apply the position of the centroid into the depth information transformation function of each detecting point, and depth information of each detecting point can be therefore obtained. According to various embodiment of the present invention, fewer or more depth information transformation functions can be used to determine the depth information transformation function of each detecting point.

Figure 5:
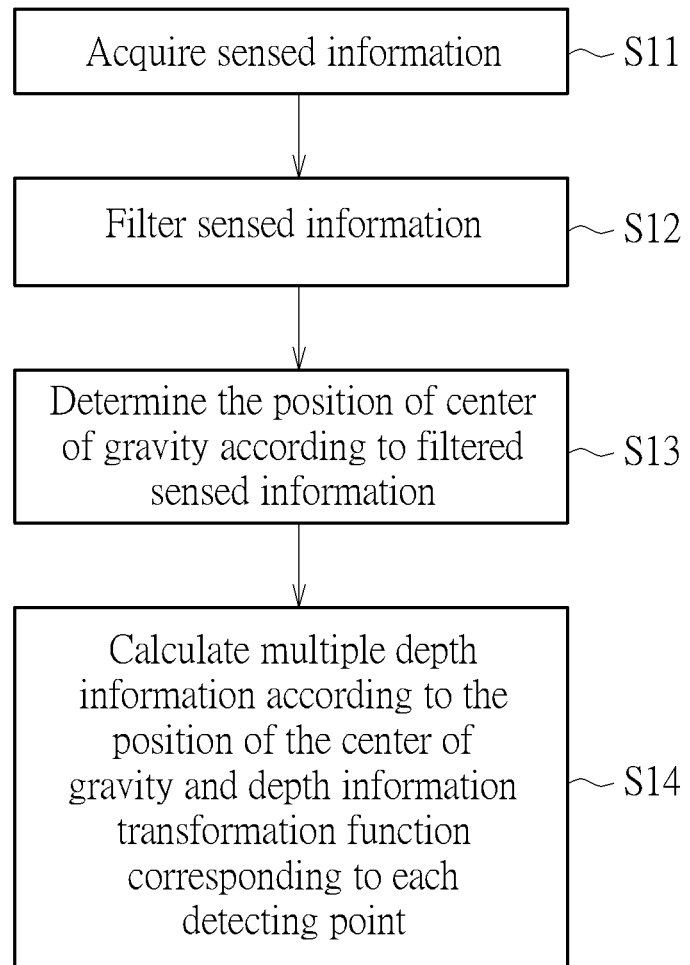
FIG. 5 illustrates a flow chart of an optical distance measurement method according to one embodiment of the present invention.

The above-mentioned embodiments can be summarized as a flow chart of FIG. 5. In step S11, sensed values are acquired by the optical sensing device. Then, in step S12, filtering of sensed values is performed, which comprises ROI filtering, threshold filter, and confidence level filtering. Please note that, step S12 may only perform one of ROI filtering, threshold filter, and confidence level filtering. This is helpful to speed up the distance measurement. After step S12, specific sensed values are selected. In step S13, according to the selected sensed values, a position of a centroid is determined. At last, in step S14, according to the position of the centroid and depth information transformation functions respectively corresponding to multiple detecting points to determine multiple depth information, wherein one of the depth information transformation functions are determined by a least one of multiple specific depth information transformation functions and at least one of weighting factors.

The flow of FIG. 5 requires the sensed values to have high reliability, and therefore uses steps S11 and S12 to exclude unreliable sensed values. However, in other implementations of the present invention, if an optical sensing device with good performance is used and reliable sensed values are obtained, steps S11 and S12 could be omitted. It uses following steps to perform optical distance measurement:

S21: Acquire a plurality of optical sensed values at different times

S22: Determine a plurality of locations of centroid according to the plurality of optical sensed values S23: Calculate a plurality of depth information corresponding to the plurality of locations of centroid according to the plurality of locations of centroid and a plurality of depth information transformation functions.

The plurality of depth information transformation functions are still obtained by way of linear function approximation.

Figure 6:
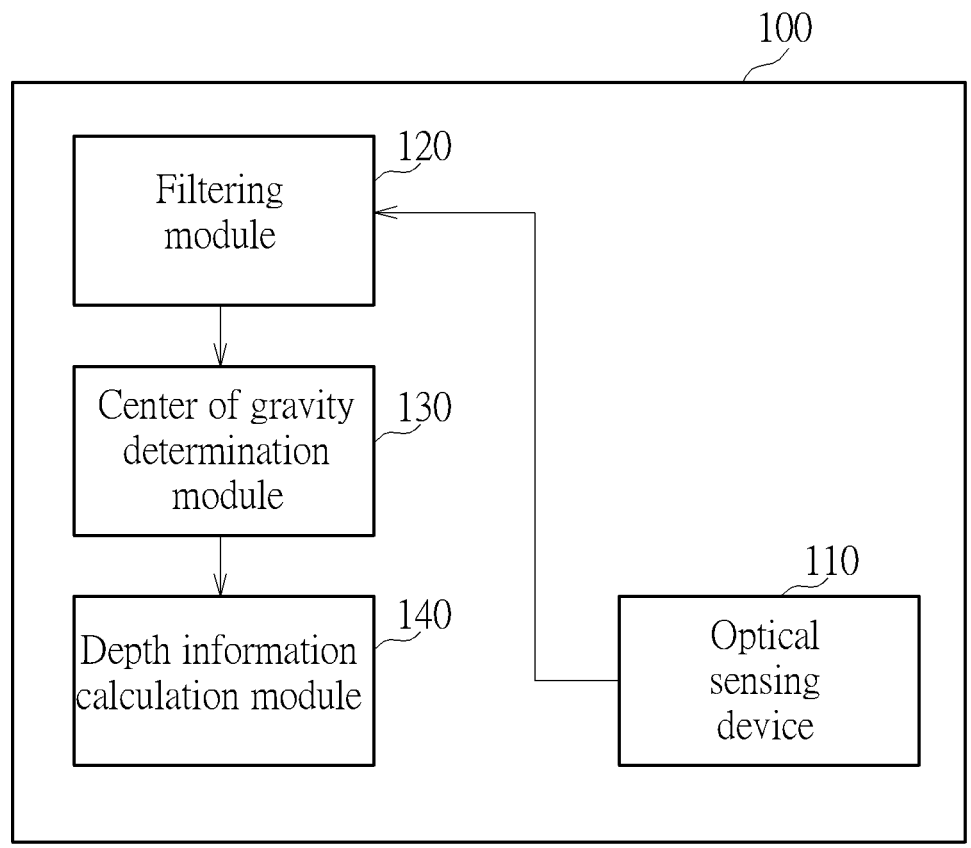
FIG. 6 illustrates a block diagram an optical distance measurement system according to one embodiment of the present invention.

In another embodiment of the present invention, an optical distance measurement system is provided. As shown by FIG. 6, an optical distance measurement system 100 of the present invention comprises: an optical sensing device 110, a filtering module 120, a centroid determination module 130 and a depth information calculation module 140. Please note that in various embodiment of the present invention, the optical distance measurement system 100 may not comprise the optical sensing device 110, and the optical distance measurement system 100 calculates the depth information according to sensed values provided by an external optical sensing device. The optical sensing device 110 could be an image sensor, which generates a plurality of sensed values based on detecting light (generated by the light source 10 built in the optical distance measurement system 100 or an external light source), wherein each sensed value can be a signal induced in one pixel of the image sensor. The filtering module 120 is coupled to the optical sensing device 110, and arranged to perform a filtering operation to pick up a plurality of selected sensed values from the plurality of sensed values. The filtering module 120 could perform one or multiple of ROI filtering, threshold value filtering and confidence level filtering. The centroid determination module 130 is coupled to the filtering module 120, and arranged to determine a position of a centroid of according to the filtered sense values. The depth information calculation module 140 is coupled to the centroid determination module 130, and arranged for calculating a plurality of depth information according to the location of the centroid and a plurality of depth information transformation functions corresponding to a plurality of detecting points, wherein the plurality of depth information transformation functions are determined according to a plurality of specific depth information transformation functions.

Steps and modules in the embodiments of the invention may include functionality that may be implemented as software executed by a processor, hardware circuits or structures, or a combination of both. The processor may be a general-purpose or dedicated processor. The software may comprise programming logic, instructions or data to implement certain functionality for an embodiment of the invention. The software may be stored in a medium accessible by a machine or computer-readable medium, such as read-only memory (ROM), random-access memory (RAM), magnetic disk (e.g., floppy disk and hard drive), optical disk (e.g., CD-ROM) or any other data storage medium. In one embodiment of the invention, the media may store programming instructions in a compressed and/or encrypted format, as well as instructions that may have to be compiled or installed by an installer before being executed by the processor. Alternatively, an embodiment of the invention may be implemented as specific hardware components that contain hard-wired logic, field programmable gate array, complex programmable logic device, or application-specific integrated circuit, for performing the recited functionality, or by any combination of programmed general-purpose computer components and custom hardware component.

Since the present invention significantly simplifies the depth information calculation, and also maintain the reliability, the requirement for hardware resources can be reduced. With the method of the present invention, depth information of multiple detecting points can be simultaneously calculated once getting a series of sensed values, such that the distance measurement can be speeded up. In addition, the present invention performs filtering on sensed values for several times, and the accuracy of the depth information calculation can be thus guaranteed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing method, comprising:
    acquiring a plurality of sensed values based on detecting light;
    comparing sensed values of each row with a corresponding threshold value to select a plurality of selected sensed values from the plurality of sensed values;
    determining a location of a centroid according to the plurality of selected sensed values; and
    calculating a plurality of depth values with respect to a plurality of detecting points according to the location of the centroid and a plurality of depth information transformation functions respectively corresponding to the detecting points.

2. The image processing method of claim 1, wherein the step of selecting the plurality of selected sensed values comprises:
    selecting the plurality of selected values from a plurality of specific sensed values that are in a specific region of a sensed frame according to relative positions of the plurality of sensed values with respect to the sensed frame.

3. The image processing method of claim 1, further comprising:
    configuring a depth information transformation function corresponding to a detecting point, comprising:
    configuring the depth information transformation function according to a plurality of first degree polynomials.

4. An image processing system, comprising:
    an optical sensing device, arranged for acquiring a plurality of sensed values based on detecting light;
    a filtering module, coupled to the optical sensing device and arranged for comparing sensed values of each row with a corresponding threshold value to select a plurality of selected sensed values from the plurality of sensed values;
    a centroid determination module, coupled to the filtering module and arranged for determining a location of a centroid according to the plurality of selected sensed values; and
    a depth information calculation module, coupled to centroid determination module and arranged for calculating a plurality of depth values with respect to a plurality of detecting points according to the location of the centroid and a plurality of depth information transformation functions respectively corresponding to the detecting points.

5. The image processing system of claim 4, wherein the filtering module selects the plurality of selected values from a plurality of specific sensed values that are in a specific region of a sensed frame according to relative positions of the plurality of sensed values with respect to the sensed frame.

6. The system of claim 4, wherein the depth information calculation module configures a depth information transformation function of a detecting point according to a plurality of first degree polynomials.

7. An image processing method, comprising:
    acquiring a plurality of sensed values at different times;
    comparing sensed values of each row with a corresponding threshold value to select a plurality of selected sensed values from the plurality of sensed values that are acquired at different times;
    determining a plurality of locations of centroid according to the plurality of selected sensed values; and
    calculating a plurality of depth information corresponding to the plurality of locations of centroid according to the plurality of locations of centroid and a plurality of transformation functions.

8. The image processing method of claim 7, wherein the plurality of depth information transformation functions are linear functions.

* * * * *